United States Patent [19]
Nabeta et al.

[11] Patent Number: 5,953,042
[45] Date of Patent: *Sep. 14, 1999

[54] DEFLECTING SCANNING APPARATUS

[75] Inventors: Noboru Nabeta, Shizuoka-ken; Yasuo Suzuki, Numazu; Yoshitaka Noh, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/610,417

[22] Filed: Mar. 4, 1996

[30] Foreign Application Priority Data

| Mar. 7, 1995 | [JP] | Japan | 7-74438 |
| Jul. 12, 1995 | [JP] | Japan | 7-199155 |
| Jan. 30, 1996 | [JP] | Japan | 8-35409 |

[51] Int. Cl.$^6$ .................... G01D 15/14
[52] U.S. Cl. .................. 347/263; 347/257
[58] Field of Search ............... 347/263, 257, 347/242, 245

[56] References Cited

U.S. PATENT DOCUMENTS

| 5,343,029 | 8/1994 | Katoh et al. | 235/467 |
| 5,646,674 | 7/1997 | Bacon et al. | 347/257 |
| 5,675,431 | 10/1997 | Bock | 347/263 |
| 5,729,793 | 3/1998 | Inoue | 399/92 |

FOREIGN PATENT DOCUMENTS

| 3-173963 | 7/1991 | Japan . |
| 5-113528 | 5/1993 | Japan . |

*Primary Examiner*—Peter S. Wong
*Assistant Examiner*—K. Shin
*Attorney, Agent, or Firm*—Fitzpatrick Cella Harper & Scinto

[57] ABSTRACT

A deflecting/scanning apparatus includes a deflector for deflecting/scanning a light beam from a light source unit, an optical system for focusing the light beam deflected/scanned by the deflector onto a surface, an optical box for accommodating the deflector and the optical system, and a cover for covering the optical box. An elastic member is disposed in the optical box so as to blocking flow of air entering therein. At least a portion of the elastic member is fitted in a recess portion formed on at least one of the optical box and the cover so that the elastic member is pressed by the cover.

58 Claims, 14 Drawing Sheets

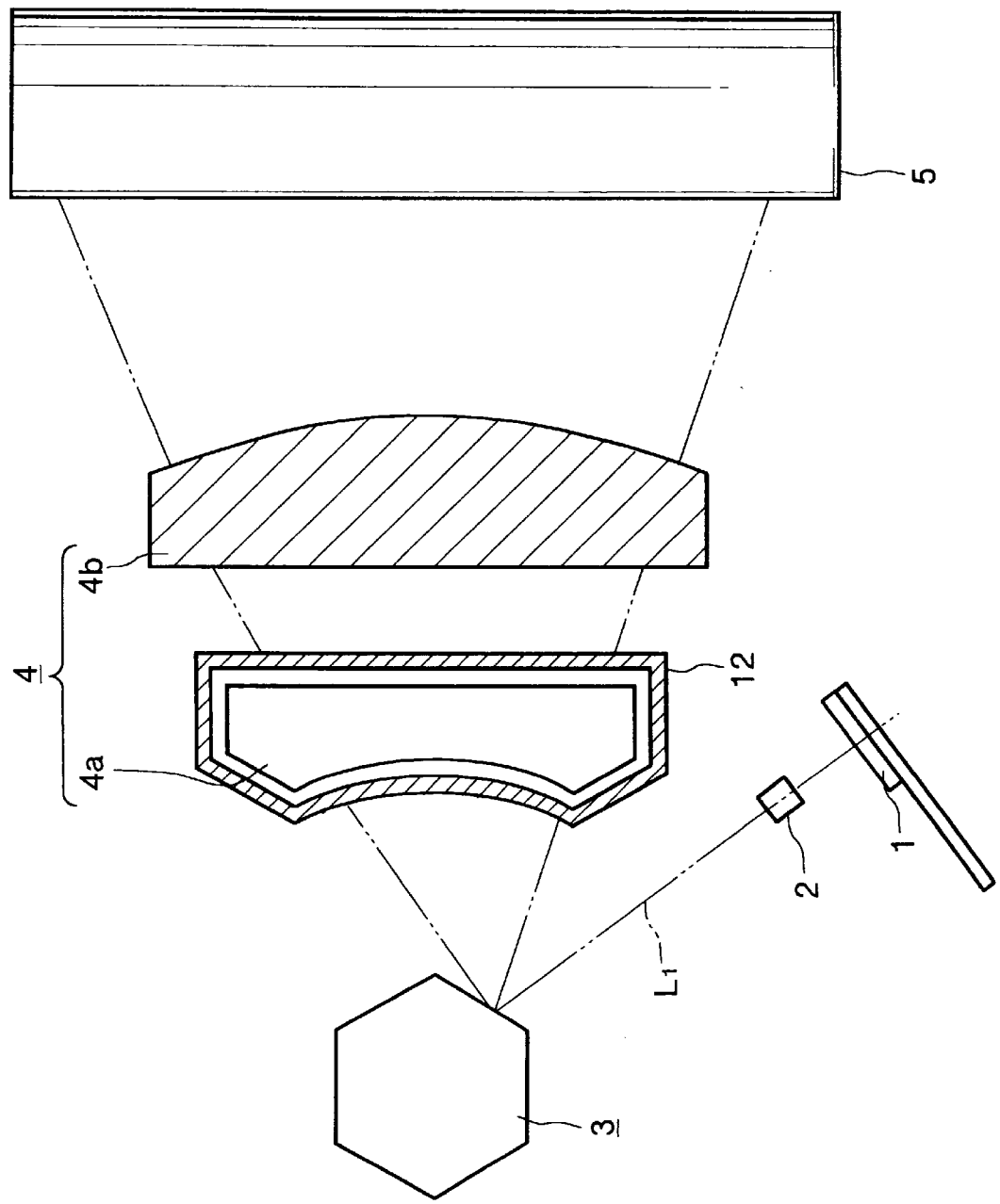

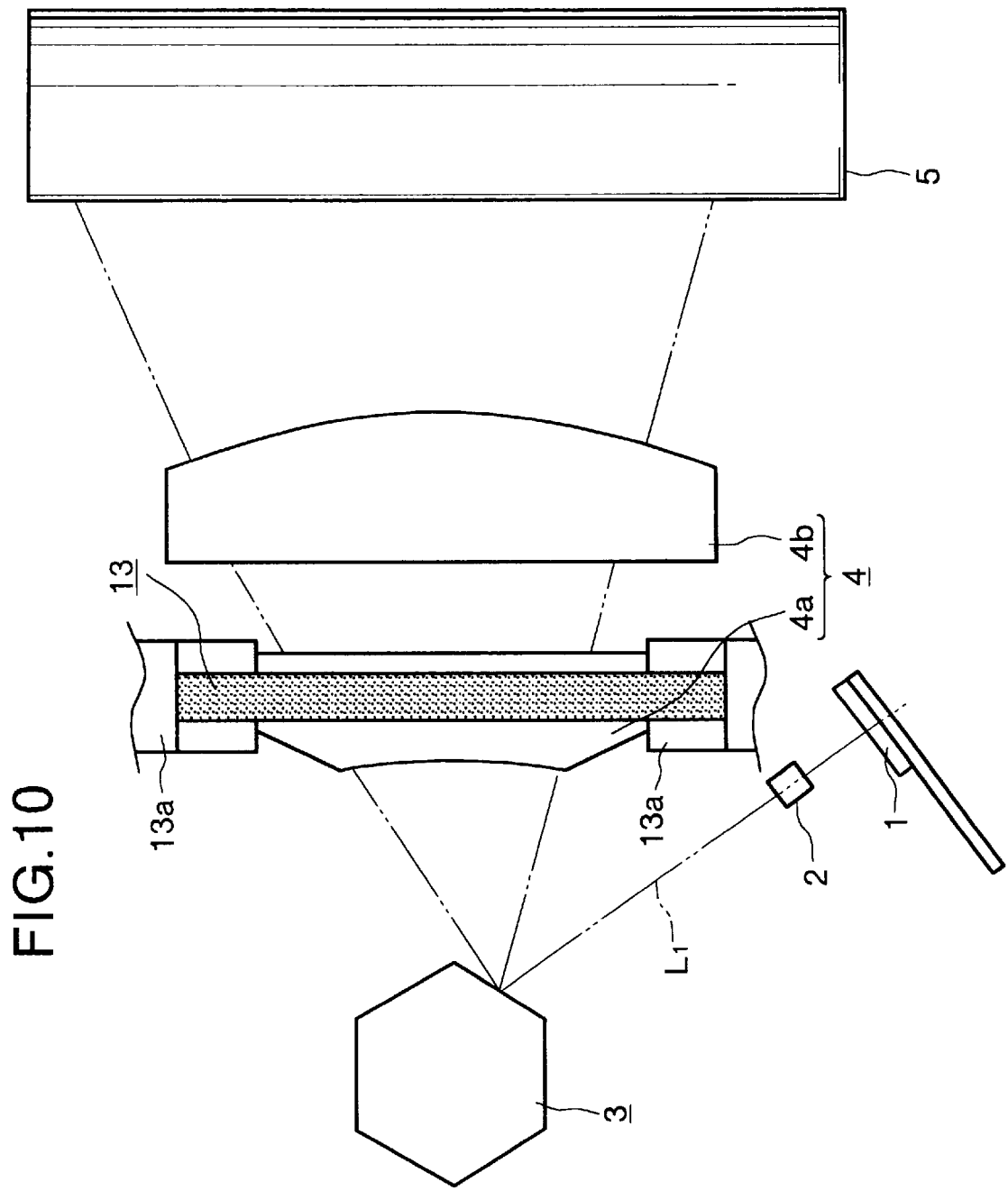

DEFLECTING SCANNING APPARATUS

BACKGROUND OF THE INVENTION

1. Field of the Invention

The present invention relates to a deflecting/scanning apparatus used for an image forming apparatus such as a laser printer or a laser facsimile apparatus.

2. Related Background Art

In a deflecting/scanning apparatus used for an image forming apparatus such as a laser printer or a laser facsimile apparatus, as shown in FIGS. 1 and 2, laser light emitted from a light source unit 101 is condensed into a beam of light by a cylindrical lens 102. The light beam is then deflected/scanned by a rotating polygon mirror 103 in a predetermined direction (Y-axis direction) perpendicular to a direction (Z-axis direction) along the rotation axis of the rotating polygon mirror 103 to be focused onto a photosensitive drum 105 via an imaging lens system 104 constituted by a spherical lens 104a and a toric lens 104b. The light beam focused onto the photosensitive drum 105 forms an electrostatic latent image by main scanning in the Y-axis direction upon rotation of the rotating polygon mirror 103 and by subscanning in the Z-axis direction upon rotation of the photosensitive drum 105.

Scanning light $L_0$ from the rotating polygon mirror 103 is separated downward by a BD mirror 106a at one end of the scanning plane (X-Y plane) in the Y-axis direction to be incident on a BD sensor 106b. The light is then converted into a scanning start signal and transmitted to a semiconductor laser in the light source unit 101. Upon reception of the scanning start signal, the semiconductor laser starts write modulation.

The light source unit 101, the cylindrical lens 102, the rotating polygon mirror 103, the imaging lens system 104, the BD mirror 106a, and the BD sensor 106b are mounted on the side and bottom walls of an optical box 107. The photosensitive drum 105 is disposed outside the optical box 107, and a window 108 is formed in a side wall of the optical box 107. The scanning light $L_0$ emerges from the optical box 107 toward the photosensitive drum 105 via the window 108. The upper opening of the optical box 107 is covered with a lid 109 shown in only FIG. 2.

The optical box 107 and the lid 109 respectively have a partition wall 107a (see FIG. 1) and a protruding portion 109a (see FIG. 2) protruding toward the spherical lens 104a. The internal space of the optical box 107 is divided, by the partition wall 107a and the protruding portion 109a, into a space portion 110a around the rotating polygon mirror 103 and a drive unit 103a therefor, and a space portion 110b facing the window 108. This structure prevents a large amount of outer air from entering the optical box 107 owing to a suction force generated upon rotation of the rotating polygon mirror 103.

According to the above conventional technique, however, the partition wall of the optical box and the protruding portion on the lid alone cannot sufficiently reduce the amount of outer air flowing around the rotating polygon mirror. For this reason, dust entering the optical box together with outer air accumulate on and around the motor for the rotating polygon mirror. Every time the motor rotates, such dust flies into the air to considerably contaminate the reflecting surfaces of the rotating polygon mirror, resulting in a great deterioration in the optical performance of the deflecting/scanning apparatus.

In addition, as shown in FIG. 2, lenses such as the spherical lens and the toric lens are fixed on a plurality of base seats 107b protruding upward from the bottom wall of the optical box 107 with an adhesive or the like. For example, a gap of about 1 mm is left between the bottom surface of each of the lenses 104a and 104b and the bottom wall of the optical box 107 on which no base seat 107b is disposed. For this reason, when the rotating polygon mirror 103 rotates at a high speed, air currents are drawn in via the above gaps, and dust carried by the air currents contaminates the reflecting surfaces of the rotating polygon mirror. Color toner or the like containing no magnetic component tends to float in the image forming apparatus. Color toner particles or the like in the above air currents therefore pass through even a very small gap. Consequently, in a color image forming apparatus, contamination on the reflecting surfaces of the polygon mirror tends to progress more quickly. As the reflecting surfaces of the rotating polygon mirror are quickly contaminated, the reflecting mirrors of the polygon mirror must be cleaned or replaced frequently, resulting in a considerable increase in maintenance cost.

SUMMARY OF THE INVENTION

It is an object of the present invention to provide a deflecting/scanning apparatus which solves the above problems and prevents dust from adhering to an optical member and a deflector.

In order to achieve the above object, according to the present invention, there is provided a deflecting/scanning apparatus comprising a deflector for deflecting/scanning a light beam from a light source unit, an optical system for focusing the light beam deflected/scanned by the deflector onto a predetermined surface, an optical box incorporating the deflector and the optical system, and a cover for covering the optical box, characterized in that an elastic member for blocking flow of air is disposed in the optical box, at least a portion of the elastic member is fitted in a recess portion formed in at least one of the optical box and the cover, and the elastic member is pressed by the cover.

In the deflecting/scanning apparatus having the above arrangement according to the present invention, at least a portion of the elastic member is fitted in the recess portion, and the elastic member is pressed by the cover so that the gap between the elastic member and the recess portion is eliminated, and so is the gap between the elastic member and the cover, thereby preventing air from flowing to the optical member and the deflector.

The present invention has been made in consideration of the above unsolved problems in the prior art, and has as its another object to provide a deflecting/scanning apparatus which can prevent outer air from entering the atmospheres around a rotating polygon mirror and a drive unit via an imaging lens such as a spherical lens or a toric lens, and can greatly reduce the maintenance cost of the rotating polygon mirror.

In order to achieve the above object, according to the present invention, there is provided a deflecting/scanning apparatus characterized by comprising a rotating polygon mirror, at least one imaging lens for focusing a light beam deflected/scanned by the rotating polygon mirror onto a photosensitive member as a predetermined surface, and housing means for housing the rotating polygon mirror in a predetermined space portion, and dustproof means for preventing dust from entering the predetermined space portion of the housing means via a bottom surface of the imaging lens.

The dustproof means preferably has a barrier integrally formed with a bottom wall of the housing means near the imaging lens.

In addition to the dustproof means, the housing means preferably has a filler or packing material disposed between a lid member of the housing means and the imaging lens.

The dustproof means preferably has a second barrier protruding from the lid member of the housing means near the imaging lens.

The dustproof means preferably has a rib-like member for locally reducing a gap between a bottom surface of the imaging lens and the bottom wall of the housing means, the rib-like portion extending in the longitudinal direction of the imaging lens.

If outer air enters the predetermined space portion of the optical box housing the rotating polygon mirror via the imaging lens, dust in the outer air adheres to the reflecting surface of the rotating polygon mirror, resulting in a decrease in reflectance. For this reason, according to the present invention, a barrier protrudes from the bottom wall of the housing means near the imaging lens to prevent entrance of outer air owing to a labyrinth effect and the like. In addition, the gap between the lid member of the housing means and the imaging lens is filled with a filler such as an urethane foam to block outer air. A deflecting/scanning apparatus is therefore realized, which prevents dust from mixing with the atmospheres around the rotating polygon mirror and the drive unit in this manner, and is free from quick contamination of the reflecting surfaces of the rotating polygon mirror even if the mirror is rotated at a high speed.

Furthermore, according to the present invention, the gap between the bottom surface of the imaging lens and the housing means is locally reduced by using the rib-like member to completely prevent dust with a predetermined particle diameter or more from passing through the gap. A deflecting/scanning apparatus is therefore realized, which prevents dust from mixing with the atmospheres around the rotating polygon mirror and the drive unit in this manner, and is free from quick contamination of the reflecting surfaces of the rotating polygon mirror.

BRIEF DESCRIPTION OF THE DRAWINGS

FIG. 9 is a sectional view taken along a line 9—9 in FIG. 8A;

FIG. 10 is a plan view showing a state wherein a lid member is removed from the apparatus in FIG. 8A;

FIGS. 15A and 15B are sectional views showing the apparatus in FIG. 14, in which FIG. 15A is a sectional view showing the overall apparatus, and FIG. 15B is an enlarged partial sectional view showing a portion of the apparatus in FIG. 15A;

DETAILED DESCRIPTION OF THE PREFERRED EMBODIMENTS

A deflecting/scanning apparatus according to an embodiment of the present invention will be described in detail below with reference to FIGS. 3 to 7.

Figure 1:
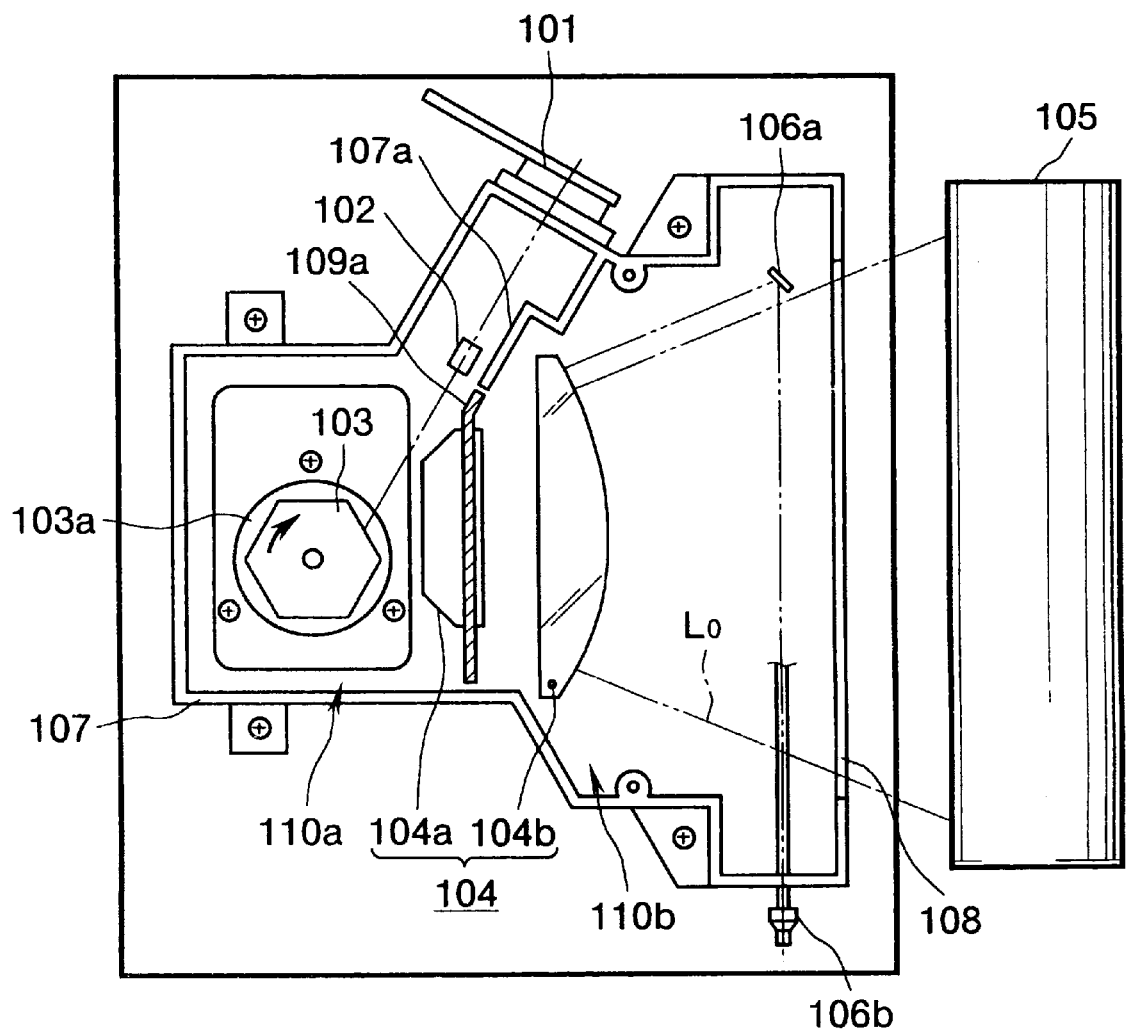
FIG. 1 is a plan view showing a state wherein a lid member is removed from a conventional deflecting/scanning apparatus.
Figure 2:
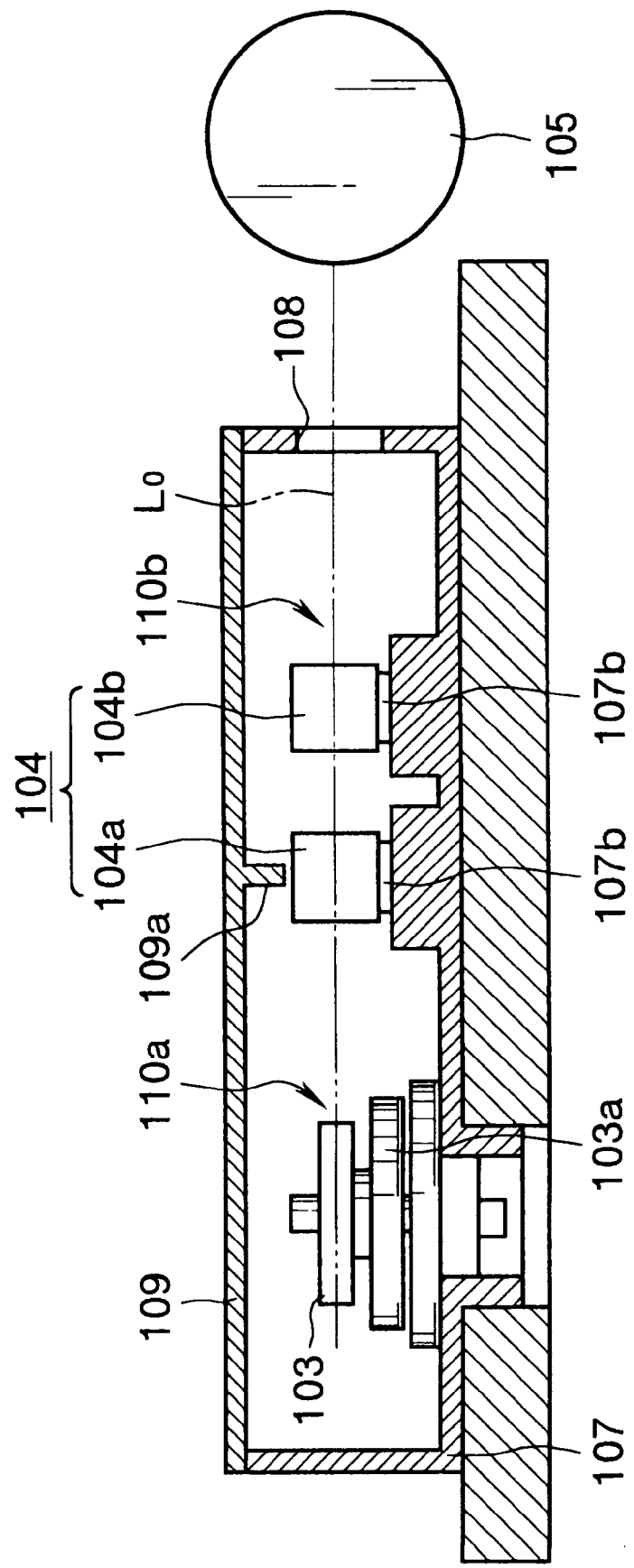
FIG. 2 is a sectional view showing the apparatus in FIG. 1.
Figure 3:
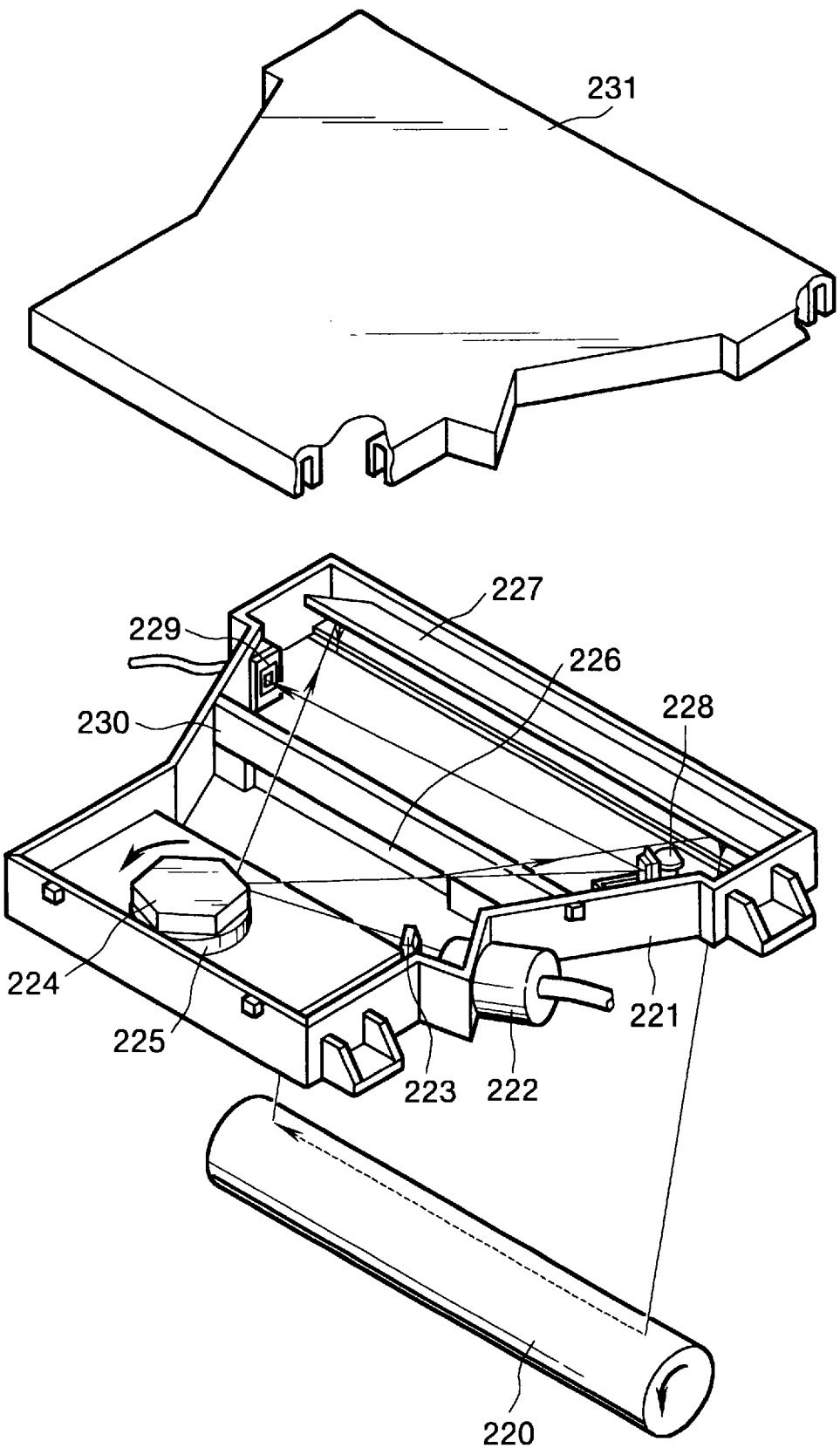
FIG. 3 is a perspective view showing a deflecting/scanning apparatus according to the first embodiment of the present invention.
Figure 4:
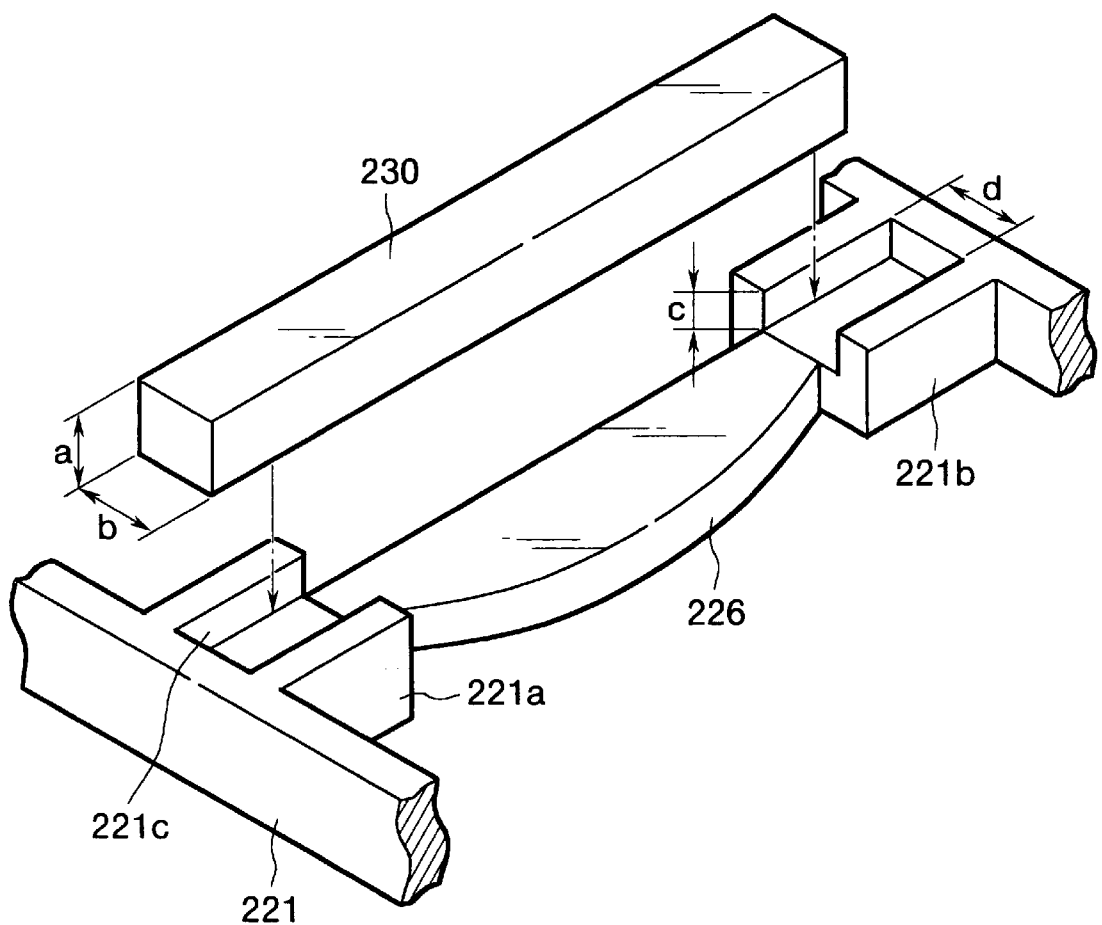
FIG. 4 is a partial enlarged perspective view of the apparatus in FIG. 3.

FIG. 3 is a perspective view showing the deflecting/scanning apparatus according to the first embodiment of the present invention. A laser unit 222 is mounted on a side wall of an optical box 221. A cylindrical lens 223 and a polygon mirror 224 are arranged in the traveling direction of a laser beam from the laser unit 222. The polygon mirror 224 is mounted on a drive motor 225 to deflect a laser beam from the laser unit 222. A lens 226 and a reflecting plate 227 are arranged in the traveling direction of the laser beam deflected by the polygon mirror 224. A recording medium or a photosensitive drum 220 is disposed in the direction in which a light beam is reflected by the reflecting plate 227. In addition, a stationary mirror 228 is disposed at one end in the direction in which a light beam is reflected by the polygon mirror 224. A timing detection sensor 229 is disposed in the direction in which the light beam is reflected by the stationary mirror 228.

An elastic member 230 is placed on the upper surface of the lens 226, and a cover 231 is put on the optical box 221 in which the above optical system and the elastic member 230 are housed. As indicated by the partial enlarged perspective view in FIG. 4, the lens 226 is positioned and fixed between mount portions 221a and 221b with the adhesive force of an adhesive, the elastic force of a spring, or the like. The mount portions 221a and 221b respectively have fitting recess portions 221c and 221d in which the two end portions of the elastic member 230 are fitted.

The elastic member 230 serves to seal the space between the upper surface of the lens 226 and the lower surface of the cover 231. The elastic member 230 is made of "moltopren" (trade name of Inoac Corp.), rubber, or the like in the form of a rectangular column. A thickness a of the elastic member 230 is set to be larger than a depth c of each of the fitting recess portions 221c and 221d. A width b of the elastic member 230 is set to be larger than a width d of each of the fitting recess portions 221c and 221d. The two end portions of the elastic member 230 are therefore fitted in the fitting recess portions 221c and 221d in a compressed state, and the upper surface of the elastic member 230 is compressed by the cover 231.

With this arrangement, a laser beam from the laser unit 222 is condensed onto a mirror surface of the polygon mirror 224 by the cylindrical lens 223. The polygon mirror 224 is rotated by the drive motor 225 at a high speed. The laser beam from the laser unit 222 is then deflected/scanned by the polygon mirror 224. The beam deflected/scanned by the polygon mirror 224 is focused by the lens 226 and reflected by the reflecting plate 227 to form a spot image on the photosensitive drum 220. At this time, the two end portions of the elastic member 230 are fitted in the fitting recess portions 221c and 221d in a compressed state. In addition, the elastic member 230 is compressed by the cover 231. For this reason, no air flows around the lens 226 toward the polygon mirror 224.

In the first embodiment, the upper surface of the lens 226 is sealed with the elastic member 230 to prevent air from flowing around the lens 226 toward the polygon mirror 224, thereby preventing dust from adhering to the polygon mirror 224.

Figure 5:
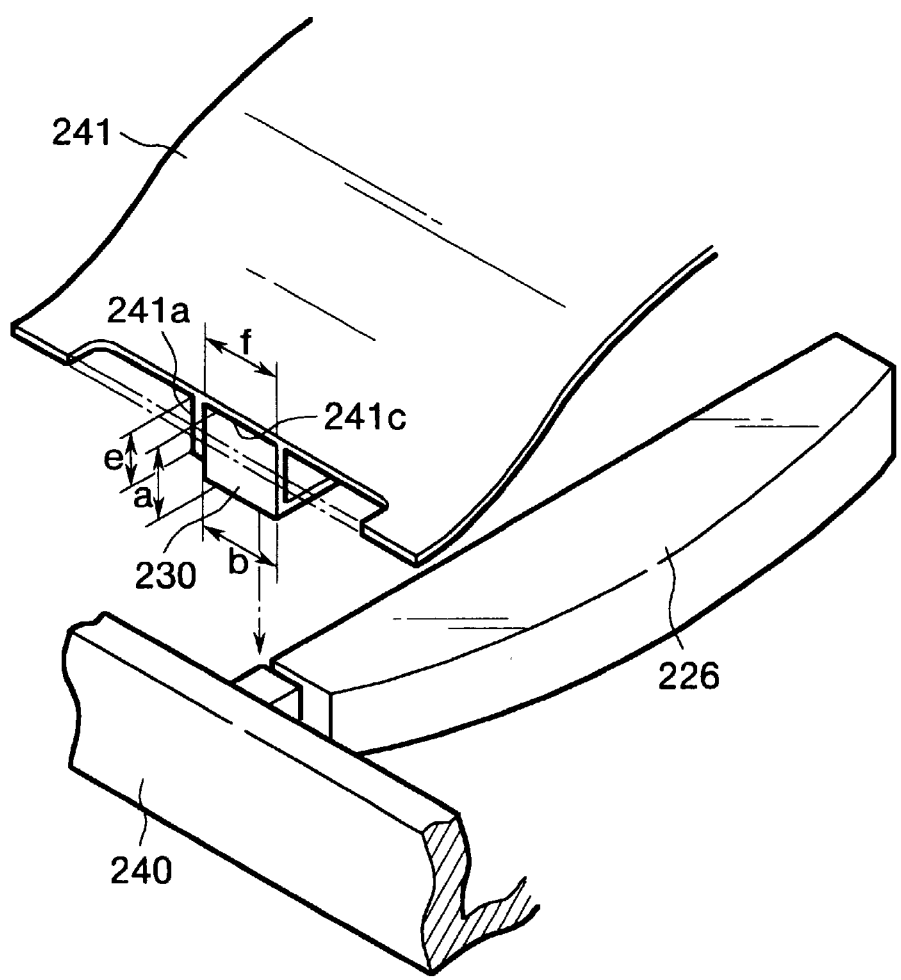
FIG. 5 is a partial enlarged perspective view of a deflecting/scanning apparatus according to the second embodiment of the present invention.

FIG. 5 is a partial enlarged perspective view showing a deflecting/scanning apparatus according to the second embodiment of the present invention. Mount portions 241a and 241b (the portion 241b is not shown) for mounting an elastic member 230 similar to the one in the first embodiment are arranged on the cover 241 side. These mount portions 241a and 241b respectively have fitting recess portions 241c and 241d (the portion 241d is not shown). A depth e of each of the fitting recess portions 241c and 241d is set to be smaller than a thickness a of the elastic member 230. A width f of each of the fitting recess portions 241c and 241d is set to be smaller than a width b of the elastic member 230.

In the second embodiment, since the two end portions of the elastic member 230 are fitted in the fitting recess portions 241c and 241d of the cover 241 covering an optical box 240 in a compressed state, the elastic member 230 does not fall from the cover 241 when the cover 241 is mounted on the optical box 240, thereby facilitating the mounting operation. Note that other functions and effects are the same as those of the first embodiment.

The fitting recess portions 241c and 241d formed on the two sides of the cover 241 can also be formed by using two continuous ribs.

Figure 6:
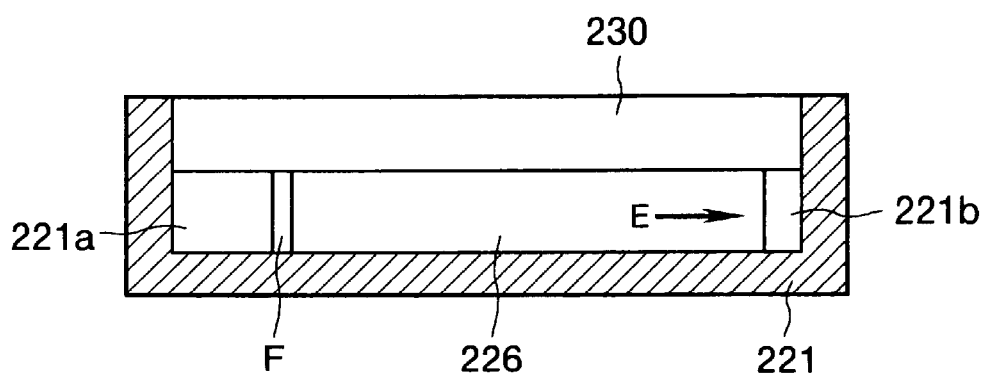
FIG. 6 is a view for explaining a state wherein a gap is formed between a lens and a mount portion.

In the first and second embodiments, as shown in FIG. 6, since one end portion of a lens 226 is pressed against the mount portion 221b in a direction E, a gap F is sometimes formed between the other end portion of the lens 226 and the mount portion 221a, and air may flow to a polygon mirror 224 side via this gap F.

Figure 7:
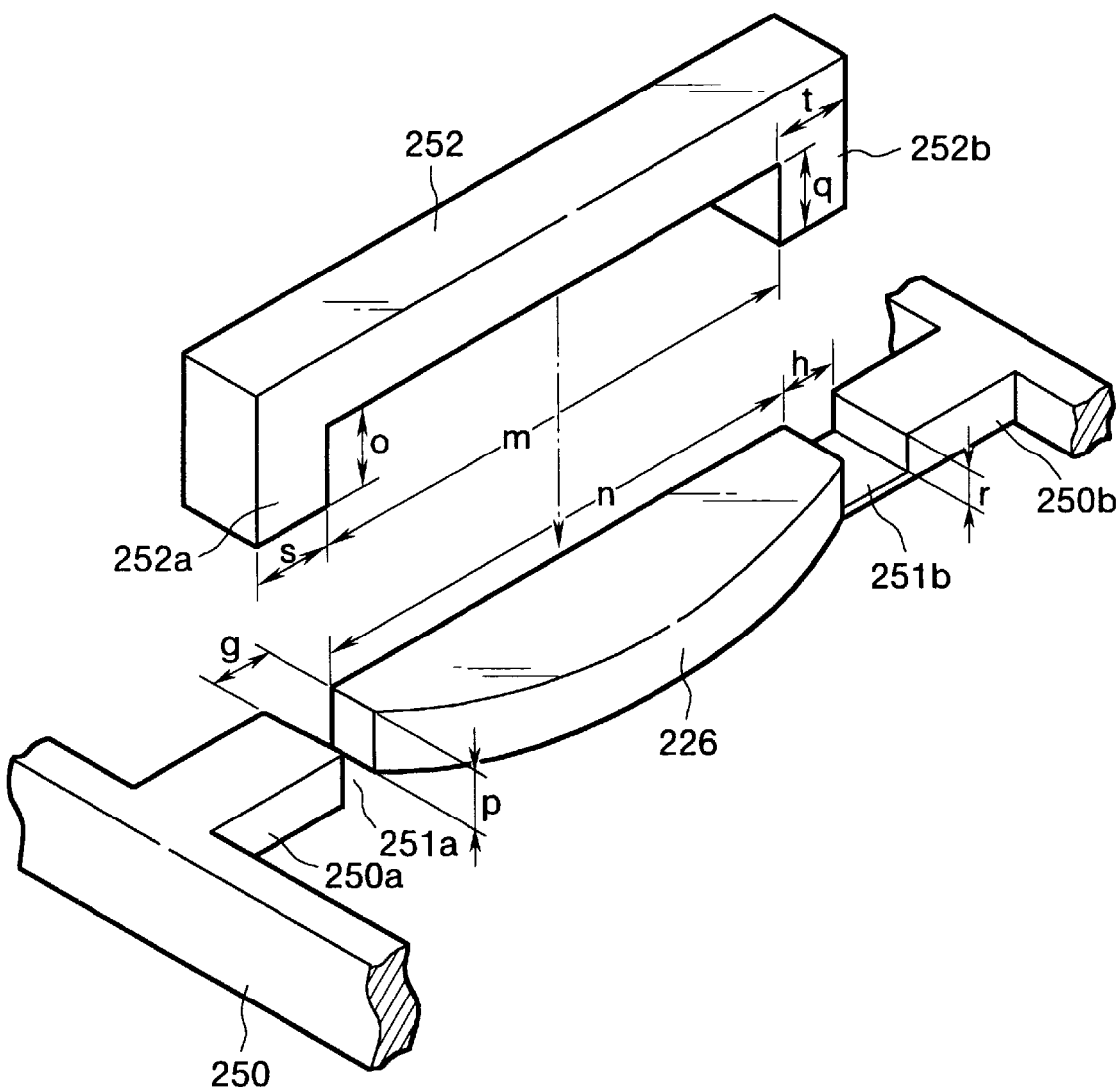
FIG. 7 is a partial enlarged perspective view of a deflecting/scanning apparatus according to the third embodiment of the present invention.

FIG. 7 is a partial enlarged perspective view showing a deflecting/scanning apparatus according to the third embodiment of the present invention which is devised to solve this problem. Gaps 251a and 251b respectively having sizes g and h are formed between the mount portions 250a and 250b of an optical box 250 and a lens 226, and protruding portions 252a and 252b on the two ends of an elastic member 252 are fitted in these gaps 251a and 251b in a compressed state.

In the third embodiment, a distance m between the protruding portions 252a and 252b of the elastic member 252 is set to be smaller than an outer diameter n of the lens 226. A height o of one protruding portion 252a is set to be larger than a height p of one mount portion 250a of the optical box 250. A height q of the other protruding portion 252b is set to be larger than a height r of the other mount portion 250b. A width s of one protruding portion 252a is set to be larger than a gap size g between the lens 226 and the mount portion 250a. With this arrangement, the protruding portions 252a and 252b of the elastic member 252 are fitted in the gaps 251a and 251b in a compressed state.

In the third embodiment, the gaps 251a and 251b at the two end portions of the lens 226 can be sealed with the elastic member 252. Other functions and effects of the third embodiment are the same as those of the first and second embodiments. In this embodiment, the gaps 251a and 251b are formed at the two end portions of the lens 226. However, one gap 251a may be omitted, and only the other gap 251b may be formed, while one protruding portion 252a of the elastic member 252 is omitted, and only the other protruding portion 252b is formed.

In the first to third embodiments described above, if the elastic members 230 and 252 are compressed by about 1 mm when they are made of moltopren, and compressed by about 0.5 mm when they are made of rubber, a sufficient sealing effect can be obtained.

As described above, the deflecting/scanning apparatus according to the first embodiment of the present invention is characterized by comprising a deflector for deflecting/scanning a light beam from a light source unit, the optical system for focusing the light beam deflected/scanned by the deflector onto a photosensitive member as a predetermined surface, the optical box incorporating the deflector and the optical system, and a cover which covers the optical box, wherein an elastic member for preventing circulation of air is disposed in the optical box, at least a portion of the elastic member is fitted in the recess portion formed in at least the optical box or the cover, and the elastic member is pressed against the cover.

The elastic member is compressed and fitted in the above recess portion.

In addition, in the deflecting/scanning apparatus of the present invention, a lens 226 is positioned and fixed on mount portions 221a and 221b of an optical box 221. The mount portions 221a and 221b respectively have fitting recess portions 221c and 221d in which the two end portions of, e.g., a rod-like elastic member 230 are fitted. A thickness of a of the elastic member 230 is set to be larger than a depth c of each of the fitting recess portions 221c and 221d. A width b of the elastic member 230 is set to be larger than a width d of each of the fitting recess portions 221c and 221d. The two end portions of the elastic member 230 are fitted in the fitting recess portions 221c and 221d in a compressed state, and the upper surface of the elastic member 230 is compressed by the cover.

As described above, in the deflecting/scanning apparatus of the present invention, at least a portion of the elastic member is fitted in the recess portion, and the elastic member is pressed by the cover. For this reason, the gap between the elastic member and the recess portion can be eliminated, and the gap between the elastic member and the cover can also be eliminated. This arrangement can prevent air from flowing toward the optical member and the deflector, and hence can prevent dust in the air from adhering to the optical member and the deflector.

Still another embodiment of the present invention will be described below.

Figure 8A:
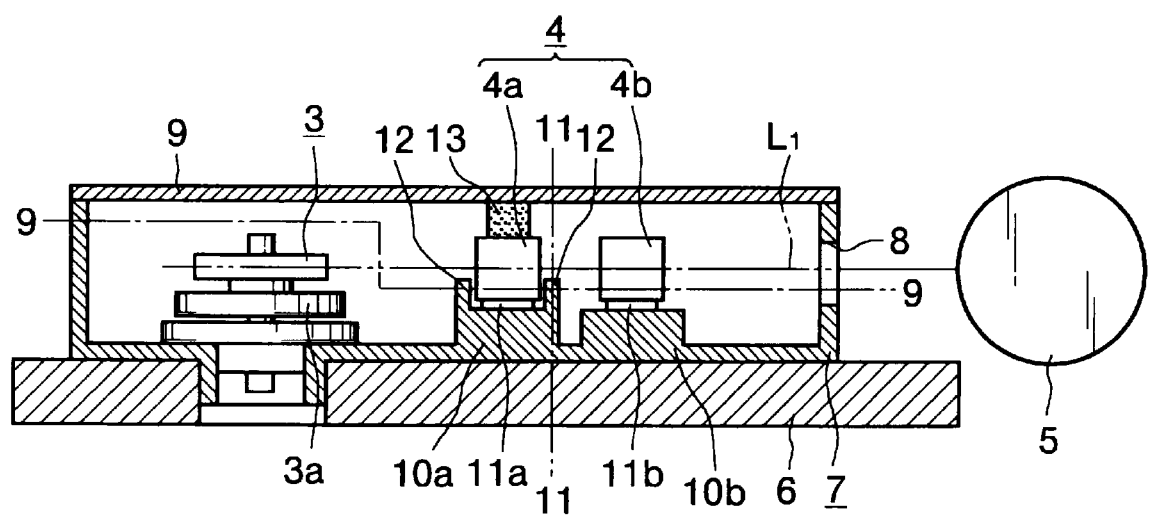
FIG. 8A is a sectional view showing a deflecting/scanning apparatus according to the fourth embodiment of the present invention.
Figure 8B:
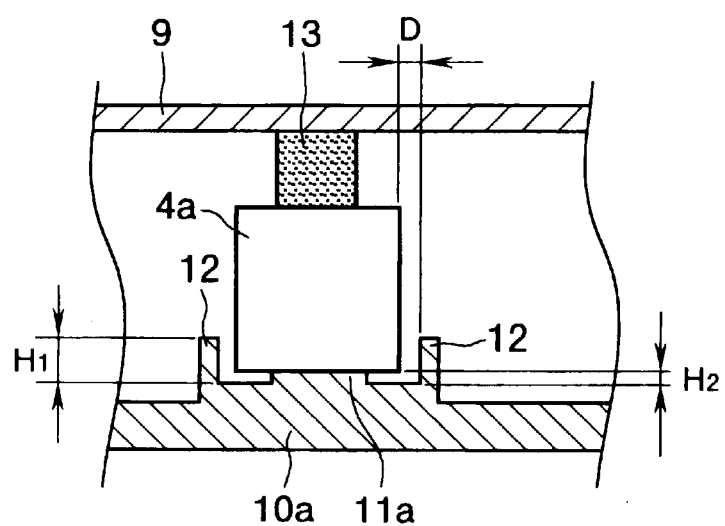
FIG. 8B is an enlarged partial sectional view of a portion around a spherical lens in the deflecting/scanning apparatus in FIG. 8A.

FIGS. 8A and 8B are sectional views showing a deflecting/scanning apparatus according to the fourth embodiment of the present invention. In this apparatus, a laser beam $L_1$ emitted from a light source 1 (see FIG. 9) is condensed into a beam of light by a cylindrical lens 2. The light beam is then deflected/scanned by a toric lens 4b in a predetermined scanning direction and focused onto a photosensitive drum 5 as a predetermined surface via an imaging lens system 4 constituted by a spherical lens 4a and the toric lens 4b. The light beam focused on the photosensitive drum 5 forms an electrostatic latent image by main scanning upon rotation of a rotating polygon mirror 3 and by sub-scanning upon rotation of the photosensitive drum 5. A drive unit 3a drives the rotating polygon mirror 3.

Of the scanning light $L_1$ on the rotating polygon mirror 3, a light component having reached one end of the scanning surface is incident on a BD sensor (not shown) and converted into a scanning start signal to be sent to the light source 1. Upon reception of the scanning start signal, the light source 1 starts write modulation.

The light source 1, the cylindrical lens 2, the rotating polygon mirror 3, the imaging lens system 4, the BD sensor, and the like are mounted on the side and bottom walls of an optical box 7 integrally formed with a body frame 6 of the deflecting/scanning apparatus. The photosensitive drum 5 is disposed outside the optical box 7, and a window 8 is formed in a side wall of the optical box 7. The scanning light $L_1$ emerges from the optical box 7 toward the photosensitive drum 5 via the window 8. The upper opening of the optical box 7 is covered with a lid member 9 as a cover constituting a housing means together with the optical box 7.

The spherical lens 4a and the toric lens 4b of the imaging lens system 4 are respectively supported on lens support members 10a and 10b integrally formed with the bottom wall of the optical box 7. A plurality of positioning base seats 11a and 11b are respectively placed on the upper surfaces of the lens support members 10a and 10b. After the base seats 11a and 11b are coated with an ultraviolet curing adhesive, and the spherical lens 4a and the toric lens 4b are mounted thereon, the adhesive is irradiated with ultraviolet rays to be cured. Note that a method of fixing the spherical lens 4a and the toric lens 4b to the base seats 11a and 11b is not limited the above method of using an adhesive.

The lens support member 10a supporting the spherical lens 4a has a rib 12 as a dustproof means (barrier) formed near the lower end portion of the spherical lens 4a to protrude upward. A height $H_1$ of the rib 12 is equal to or larger than a distance D to the side surface of the spherical lens 4a. In addition, the height $H_1$ of the rib 12 exceeds a height $H_2$ of the base seat 11b of the base seat 11a, so that the rib 12 opposes the two side surfaces of the spherical lens 4a. These relationships are summarized as:

$H_1 \geq D$ $H_1 > H_2$

The height $H_2$ of the base seat 11a of the spherical lens 4a is preferably small to minimize the gap formed below the spherical lens 4a. If, however, the base seat 11a is too low, inconvenience is caused in positioning the spherical lens 4a. In general, therefore, the height $H_2$ is set to be about 0.3 mm.

The rib 12 seals the gap below the lower end of the spherical lens 4a owing to a so-called labyrinth effect to prevent dust in outer air and the like from entering the atmosphere around the rotating polygon mirror 3 via the lower end (bottom surface) of the spherical lens 4a.

The space between the upper end (upper surface) of the spherical lens 4a and the lid member 9 is filled with a filler 13 as an elastic material serving as a dustproof means such as "moltopren", a commercially available urethane foam. The filler 13 prevents dust from entering the atmosphere around the rotating polygon mirror 3 via the upper end of the spherical lens 4a, similar to the rib 12.

As shown in FIG. 10, the two ends of the filler 13 are held by a holder 13a integrally formed with the side wall of the optical box 7. When the lid member 9 is fixed to the optical box 7 with screws or the like, the filler 13 is slightly compressed to be in tight in contact with the lid member 9.

Figure 11:
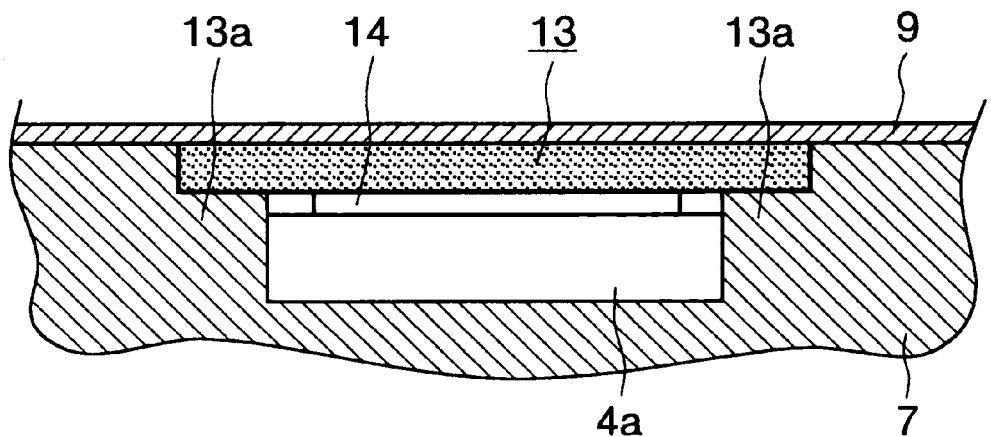
FIG. 11 is a partial sectional view taken along a line 11—11 in FIG. 8A.
Figure 12:
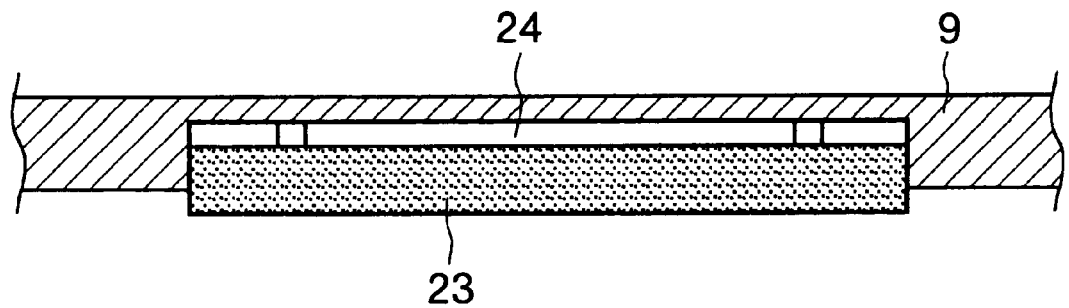
FIG. 12 is a partial sectional view of a modification of the fourth embodiment.

If the filler 13 is only held by the holder 13a, the position of the filler 13 may shift before the lid member 9 is mounted, resulting in deterioration in assembly performance. To solve this problem, as shown in FIG. 11, a central portion as a portion of the filler 13 in the longitudinal direction may be bonded to the spherical lens 4a with a double-coated adhesive tape 14. Alternatively, as shown in FIG. 12, a filler 23 may be fixed to the lid member 9 with a double-coated adhesive tape 24.

According to this embodiment, dust in outer air can be effectively prevented from entering the atmosphere around the rotating polygon mirror via the upper and lower ends of the spherical lens. For this reason, even if the rotating polygon mirror is rotated at a high speed to increase the force acting to suck outer air, or cool air is flowed to cool the cartridge or the power supply unit in the image forming apparatus, dust does not enter the atmosphere around the rotating polygon mirror to quickly contaminate the reflecting surface of the rotating polygon mirror. Therefore, the frequency at which the rotating polygon mirror is replaced or the reflecting mirror is cleaned because of contamination on the reflecting surface of the rotating polygon mirror, can be reduced, and the maintenance cost can be greatly reduced.

Note that the same effect as that described above can be expected even if a filler or rib is disposed around the toric lens instead of disposing it around the spherical lens to block outer air.

Figure 13:
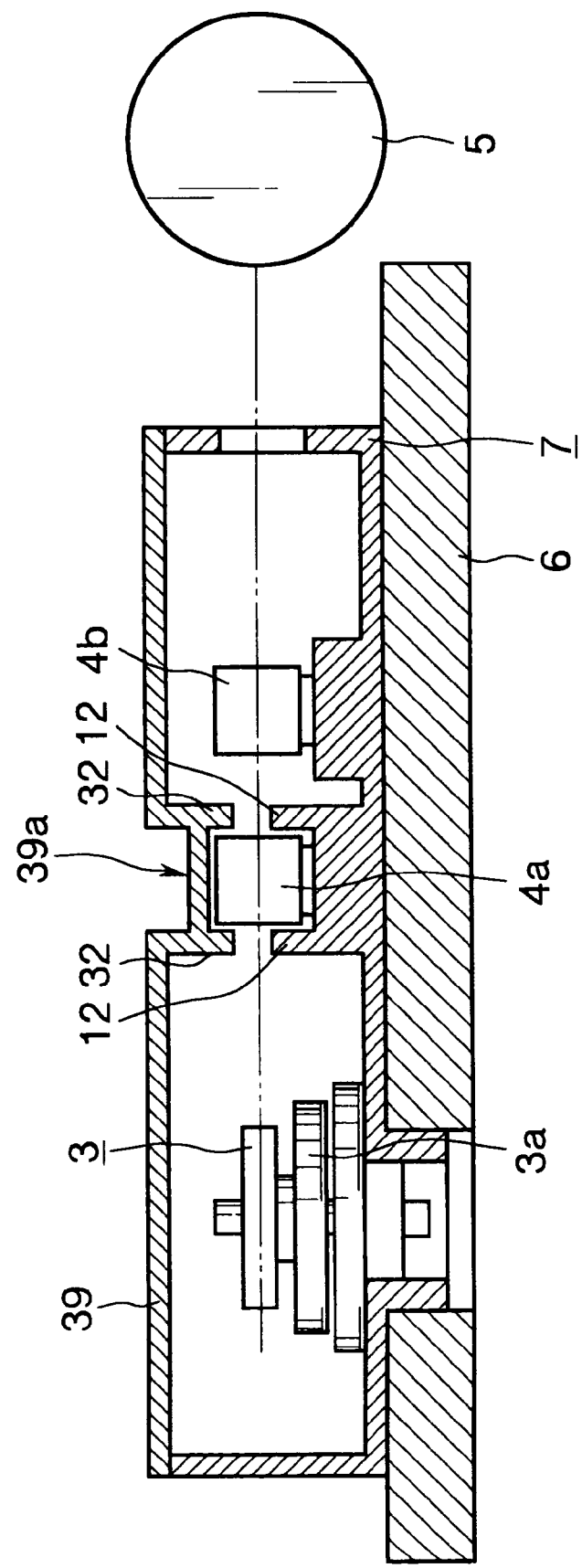
FIG. 13 is a sectional view showing a deflecting/scanning apparatus according to the fifth embodiment of the present invention.

FIG. 13 is a sectional view showing a deflecting/scanning apparatus according to the fifth embodiment of the present invention. Instead of using the filler 13 in the fourth embodiment, a concave portion 39a is formed in a lid member 39 for sealing the upper opening of an optical box 7, and the concave portion 39a is brought near to the upper surface of a spherical lens 4a, while a rib 32 as a second barrier is formed to protrude from the concave portion 39a into the optical box 7. The rib 32 has the same structure as that of a rib 12 of the optical box 7, and block an air current flowing around the spherical lens 4a owing to a labyrinth effect.

A rotating polygon mirror 3, the spherical lens 4a, a photosensitive drum 5, the optical box 7, and the like are the same as those in the fourth embodiment, and hence are denoted by the same reference numerals as those in FIGS. 8A and 8B. A description of these components will therefore be omitted.

According to the fourth and fifth embodiments, an air current flowing around the bottom and upper surfaces of the spherical lens is effectively blocked by the first and second ribs to prevent contamination on the reflecting surface of the rotating polygon mirror and omit the filler. The number of parts constituting the apparatus can therefore be decreased, and hence the cost of the image forming apparatus as a laser printer can be greatly reduced.

The deflecting/scanning apparatus of the fourth and fifth embodiments described above is characterized by comprising a rotating polygon mirror, at least one imaging lens for focusing a light beam deflected/scanned by the rotating polygon mirror onto a photosensitive member as a predetermined surface, a housing means for housing the rotating polygon mirror in a predetermined space, and a dustproof means for preventing dust from entering the predetermined space of the housing means via the bottom surface of the imaging lens.

The dustproof means has a barrier integrally formed with the bottom wall of the housing means near the imaging lens.

In addition, the apparatus is characterized in that the dustproof means has a filler placed between the lid member of the housing means and the imaging lens.

Furthermore, the apparatus is characterized in that the dustproof means has a second barrier protruding from the lid member of the housing means near the imaging lens.

Moreover, the apparatus is characterized in that the filler is bonded to the lid member of the imaging lens with a double-coated adhesive tape, and the double-coated adhesive tape is bonded to a portion of the filler in the longitudinal direction.

In the deflecting/scanning apparatus of the present invention, the scanning light $L_1$ from the rotating polygon mirror 3 emerges from the window 8 of the optical box 7 toward the photosensitive drum 5 via the spherical lens 4a and the toric lens 4b. The lower end of the spherical lens 4a is fixed to the base seat 11a, and the rib 12 is formed to oppose a side surface of the spherical lens 4a, thereby blocking an air current flowing around the lower end of the spherical lens 4a owing to a labyrinth effect. The filler 13, e.g., an urethane foam, is disposed between the upper end of the spherical lens 4a and the lid member 9 to block an air current flowing around the upper end of the spherical lens 4a.

Figure 14:
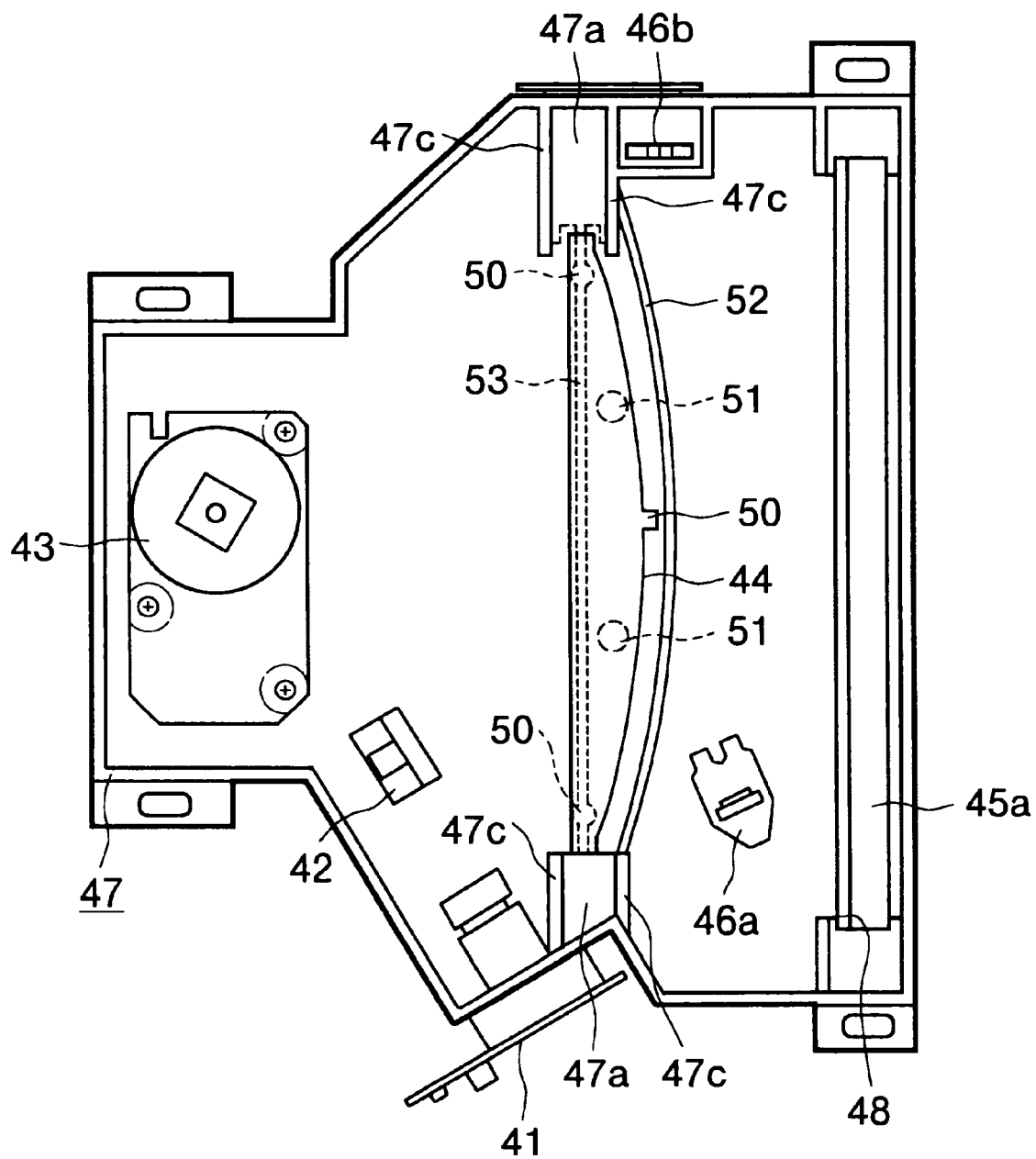
FIG. 14 is a plan view showing a state wherein a lid member is removed from a deflecting/scanning apparatus according to the sixth embodiment of the present invention.

FIG. 14 is a plan view showing a state wherein the lid is removed from a deflecting/scanning apparatus of the sixth embodiment of the present invention. In this apparatus, a laser beam as a light beam emitted from a light source unit 41 is condensed into a beam of light by a cylindrical lens 42, and is deflected/scanned by a rotating polygon mirror 43 in a direction (Z-axis direction) along the rotation axis of the rotating polygon mirror 43. The light beam is then focused onto a photosensitive drum 45 (see FIG. 15A) via an imaging lens 44 having a known f-θ function. The light beam focused on the photosensitive drum 45 forms an electrostatic latent image by main scanning in the Y-axis direction upon rotation of the rotating polygon mirror 43 and by subscanning in the Z-axis direction upon rotation of the photosensitive drum 45.

A scanning light from the rotating polygon mirror 43 is separated downward by a BD mirror 46a at one end of the scanning plane (X-Y plane) in the Y-axis direction to be incident on a BD sensor 46b. The light is then converted into a scanning start signal and transmitted to a semiconductor laser in the light source unit 41. Upon reception of the scanning start signal, the semiconductor laser starts write modulation.

Figure 15A:
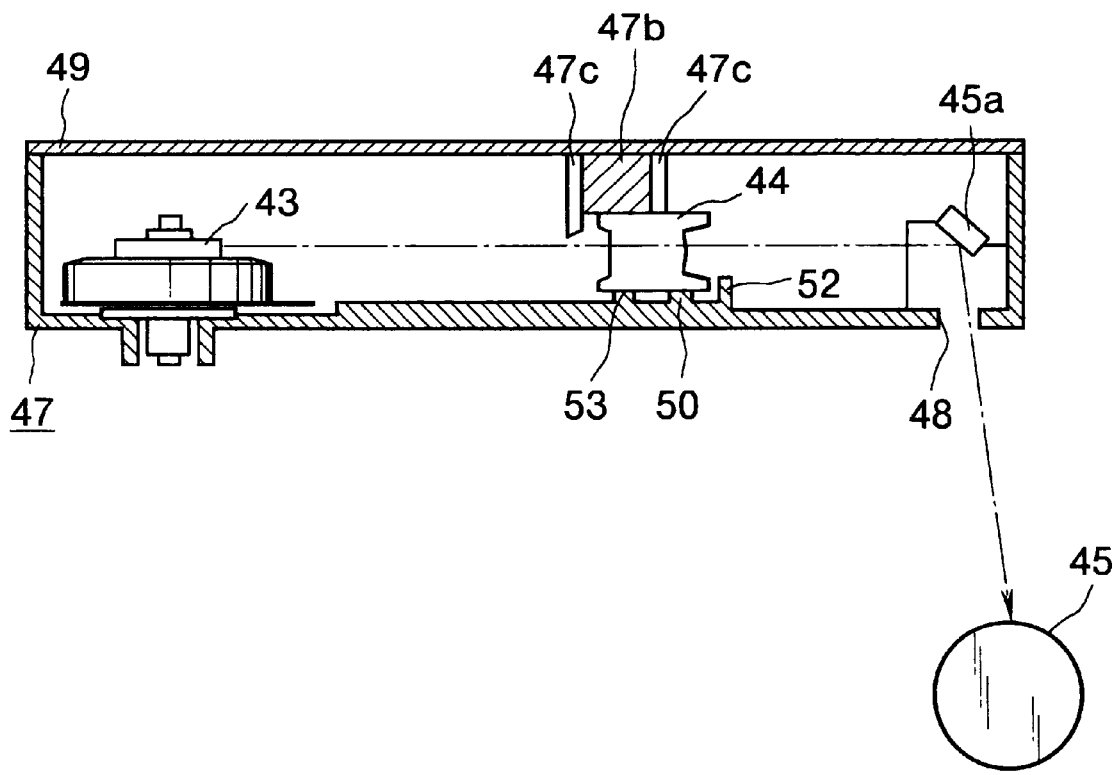
Figure 15B:
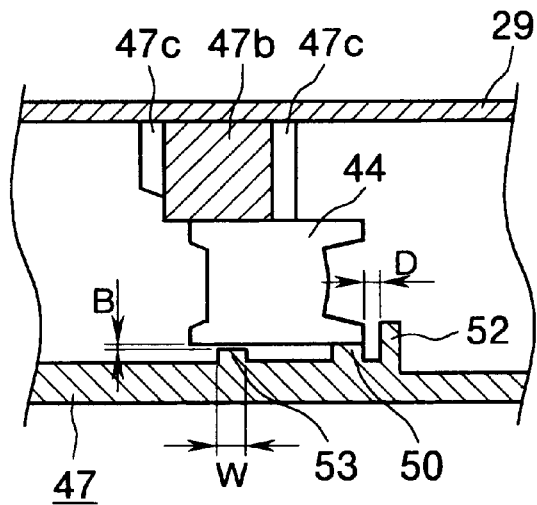

FIGS. 15A and 15B are sectional views showing the apparatus in FIG. 14. FIG. 15A is a sectional view showing the overall arrangement of the apparatus. FIG. 15B is an enlarged partial sectional view of a portion of the apparatus in FIG. 15A.

The light source unit 41, the cylindrical lens 42, the rotating polygon mirror 43, the imaging lens 44, the BD mirror 46a, and the BD sensor 46b are mounted on the side and bottom walls of an optical box 47. The photosensitive drum 45 is disposed outside the optical box 47, and a window 48 is formed in a side wall of the optical box 47. The scanning light $L_0$ emerges from the optical box 107 toward the photosensitive drum 105 via the window 108. The upper opening of the optical box 47 is covered with a lid member 49 constituting a housing means together with the optical box 47.

The bottom surface of the imaging lens 44 abuts against the abutment reference surfaces (upper surfaces) of three abutment members 50 extending vertically from the bottom wall of the optical box 47, and is fixed to a pair of base seats 51 extending vertically from the bottom wall of the optical box 47 with an adhesive applied to the upper surfaces of the base seat 51 to a thickness of about 0.05 to 0.1 mm.

The space defined by the two side surfaces of the imaging lens 44 and a side wall of the optical box 47 is sealed with a protruding portion 47a formed on the side wall to prevent outer air from entering the atmosphere around the rotating polygon mirror 43 via the two side surfaces of the imaging lens 44.

The bottom wall of the optical box 47 has a rib 52 as a barrier extending vertically near the lower end portion of the imaging lens 44, and a rib projection 53 as a rib-like member extend vertically toward the bottom surface of the imaging lens 44. The rib projection 53 constitutes a dustproof means together with the rib 52. As shown in FIG. 15B, a distance D from the rib 52 to the upper surface of the imaging lens 44 which opposes the rib 52 is set to be about 1 mm in consideration of the shape precision and positioning precision of the imaging lens 44. This arrangement has a function of decreasing the amount of air bypassing the bottom surface of the imaging lens 44 owing to a labyrinth effect similar to that of the rib 12 in the fourth and fifth embodiments. If this distance D is 2 mm or less, outer air can be sufficiently prevented from entering the atmosphere around the rotating polygon mirror 43 via the imaging lens 44.

The rib projection 53 extends along the total length of the imaging lens 44, and has a width W which is set to be 1.0 to 3.0 mm. Two of the three abutment members 50 are integrally formed with the rib projection 53 at positions near its two ends.

As described above, the imaging lens 44 abuts against the abutment members 50 on the bottom wall of the optical box 47 and fixed to the bottom wall of the optical box 47 with the adhesive applied to the base seat 51. In general, a distance B between the bottom wall of the optical box 47 and the bottom surface of the imaging lens 44 needs to be about 0.3 mm. For this reason, when the particle diameter of dust in outer air entering the optical box 47 is small, even if the amount of outer air bypassing the bottom surface of the imaging lens 44 is reduced owing to the labyrinth effect of the rib 52, it is difficult to prevent dust particles having a particle diameter of about 0.2 mm or less from contaminating the reflecting surface of the rotating polygon mirror 43 via the bottom surface of the imaging lens 44.

The reason why the distance from the bottom wall of the optical box 47 to the bottom surface of the imaging lens 44 needs to be about 0.3 mm is that the bottom wall of the optical box 47 is large and its flatness can be limited to only 0.1 to 0.2 mm. In addition, the surface precision of the abutment reference surface of each abutment member 50 which abuts against the bottom surface of the imaging lens 44 inevitably has an error of about ±0.05 mm.

In a normal office environment, dust in outer air entering the optical box 47 is roughly classified into dust with a particle diameter of 0.5 μm or less and dust with a particle diameter of 0.2 mm or more. Dust that accounts for most of the contamination on the reflecting surface of the rotating polygon mirror 43 is dust with a particle diameter of 0.2 mm or more. With the rib projection 53 formed on the bottom wall of the optical box 47 to protrude toward the bottom surface of the imaging lens 44, the gap between the bottom surface of the imaging lens 44 and the bottom wall of the optical box 47 is locally reduced to prevent dust with a particle diameter of 0.2 mm or more from entering the atmosphere around the rotating polygon mirror 43 via the bottom surface off the imaging lens 44.

Since the width W of the rib projection 53 is as small as about 0.1 to 0.3 mm, its flatness can be suppressed to about 0.05 mm by a general polishing process. Even if an error of ±0.03 mm with respect to the surface precision of the abutment reference surface of each abutment member 50 is added to this flatness, 0.08 mm is sufficient as the distance between the upper end of the rib projection 53 and the bottom surface of the imaging lens 44. That is, with the rib projection 53, the gap between the bottom wall of the optical box 47 and the bottom surface of the imaging lens 44 is locally reduced to about 0.1 to 0.15 mm to completely prevent entrance of dust with a particle diameter of 0.2 mm or more.

As in this embodiment, the amount of outer air bypassing the bottom surface of the imaging lens decreases owing to the labyrinth effect of the rib disposed near the imaging lens. In addition, the gap between the bottom surface of the imaging lens and the bottom wall of the optical box is locally reduced by the rib projection protruding from the bottom wall of the optical box toward the bottom surface of the imaging lens to block most of dust which contaminates the reflecting surface of the rotating polygon mirror. With this arrangement, the maintenance cost of the rotating polygon mirror can be greatly reduced.

Note that the gap between the imaging lens 44 and the lid member 49 is sealed with a filler 47*b* disposed therebetween. As the filler 47*b*, "moltopren" (trade name of Inoac Corp.), a commercially available urethane foam, or the like is used as in the case of the filler 13 in the fourth embodiment. In addition, the filler 47*b* is disposed by inserting its two ends into the space between holding members 47*c* arranged on a side wall of the optical box 47 with pressure.

Note that the number of rib projections protruding from the bottom wall of the optical box to the bottom surface of the imaging lens is not limited to one. If two or more rib projections are arranged to be parallel to each other, the dustproof effect improves.

Figure 16:
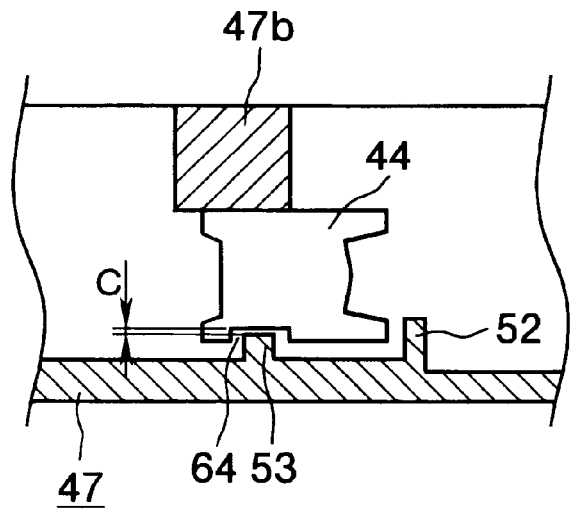
FIG. 16 is an enlarged partial sectional view showing a modification of the sixth embodiment.

If a recess 64 is formed in the bottom surface of the imaging lens 44 to oppose the rib projection 53 as shown in FIG. 16, a labyrinth effect similar to that of the rib 52 can be obtained to further improve the dustproof effect. In this case, a gap C between the bottom surface of the recess of the imaging lens 44 and the rib projection 53 is set to be about 0.1 to 0.15 mm.

Figure 17:
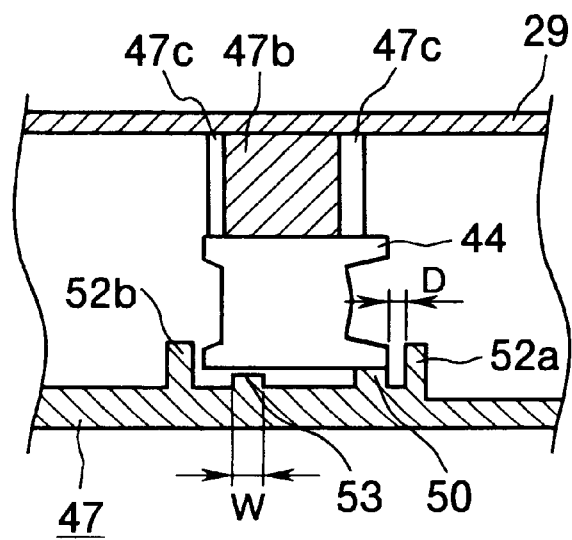
FIG. 17 is an enlarged partial sectional view showing another modification of the sixth embodiment.

If ribs 52*a* and 52*b* are formed on the bottom wall of the optical box 47 to extend upward on the front and rear sides of the imaging lens 44, as shown in FIG. 17, the dustproof effect improves more.

The above deflecting/scanning apparatus of the sixth embodiment of the present invention includes a rotating polygon mirror, at least one imaging lens for focusing a light beam deflected/scanned by the rotating polygon mirror onto a photosensitive member as a predetermined surface, a housing means for housing the rotating polygon mirror in a predetermined space portion, and a dustproof means for preventing dust from entering the predetermined space portion of the housing means via the bottom surface of the imaging lens. This apparatus is characterized in that the dustproof means has a rib-like member for locally reducing the gap between the bottom surface of the imaging lens and the bottom wall of the housing means, and the rib-like member extends along the longitudinal direction of the imaging lens.

The apparatus is also characterized in that the rib-like member is disposed to face a recess formed in the bottom surface of the imaging lens.

In addition, the apparatus is characterized in that the gap is locally reduced to 0.15 mm or less.

Since the present invention have the above arrangement, the following effects can be obtained.

This arrangement can prevent dust from entering the atmospheres around the rotating polygon mirror and the drive unit via the imaging lens such as a spherical lens or a toric lens, thereby greatly reducing the maintenance cost of the deflecting/scanning apparatus. Such a deflecting/scanning apparatus can increase the processing speed of a laser printer as an image forming apparatus and can greatly contribute to a reduction in maintenance cost.

What is claimed is:

1. A deflecting/scanning apparatus comprising:
   a light source unit;
   a deflector for deflecting/scanning a light beam from said light source unit;
   an optical system for focusing the light beam deflected/scanned by said deflector onto a predetermined surface;
   an optical box incorporating said deflector and said optical system;
   a cover for covering said optical box;
   a recess portion formed in at least one of said optical box and said cover; and
   an elastic member disposed in said optical box to block an air, said elastic member having at least a portion which is fitted in said recess portion, and said elastic member being pressed by said cover.

2. An apparatus according to claim 1, wherein said elastic member is compressed and fitted in said recess portion.

3. A deflecting/scanning apparatus comprising:
   a light source unit;
   a deflector for deflecting/scanning a light beam from said light source unit;
   an optical system for focusing the light beam deflected/scanned by said deflector onto a predetermined surface;
   an optical box incorporating said deflector and said optical system;
   a cover for covering said optical box;
   dustproof means for preventing dust from entering a space portion, in which said deflector is housed, via said optical system, said dustproof means comprising a barrier integrally formed with a bottom wall of said optical box near said optical system.

4. An apparatus according to claim 3, further comprising a filler disposed between said cover and said optical system.

5. An apparatus according to claim 3, wherein said dustproof means further comprises a barrier protruding from said cover near said optical member.

6. A laser beam printer apparatus comprising:
   a light source unit;
   a deflector for deflecting/scanning a light beam from said light source unit;
   an optical system for focusing the light beam deflected/scanned by said deflector onto a predetermined surface;
   an optical box incorporating said deflector and said optical system;
   a cover for covering said optical box;
   a recess portion formed in at least one of said optical box and said cover;
   an elastic member disposed in said optical box to block an air, said elastic member having at least a portion which is fitted in said recess portion, and said elastic member being pressed by said cover; and
   a photosensitive member for receiving the light beam deflected/scanned by said deflector.

7. An apparatus according to claim 6, wherein said elastic member is compressed and fitted in said recess portion.

8. A laser beam printer apparatus comprising:

a light source unit;

a deflector for deflecting/scanning a light beam from said light source unit;

an optical system for focusing the light beam deflected/ scanned by said deflector onto a predetermined surface;

an optical box incorporating said deflector and said optical system;

a cover for covering said optical box;

dustproof means for preventing dust from entering a space portion, in which said deflector is housed, via said optical system, said dustproof means comprising a barrier integrally formed with a bottom wall of said optical box near said optical system; and a photosensitive member for receiving the light beam deflected/scanned by said deflector.

9. An apparatus according to claim 8, further comprising a filler disposed between said cover and said optical system.

10. An apparatus according to claim 8, wherein said dustproof means further comprises a barrier protruding from said cover near said optical member.

11. A deflecting/scanning apparatus comprising:

a light source unit;

a deflector for deflecting/scanning a light beam from said light source unit;

an optical system for focusing the light beam from said light source unit onto a predetermined surface;

an optical box incorporating said deflector and said optical system;

a cover for covering said optical box;

a recess portion formed in at least one of said optical box and said cover; and an elastic member disposed in said optical box to block flow of air, said elastic member having at least a portion which is fitted in said recess portion, and said elastic member being pressed by said cover.

12. An apparatus according to claim 11, wherein said elastic member is compressed and fitted in said recess portion.

13. A deflecting/scanning apparatus comprising:

a light source unit;

a deflector for deflecting/scanning a light beam from said light source unit;

an optical system for focusing the light beam from said light source unit onto a predetermined surface;

an optical box incorporating said deflector and said optical system;

a cover for covering said optical box; and dustproof means for preventing dust from entering a space portion, in which said deflector is housed, via said optical system, said dustproof means comprising a barrier integrally formed with a bottom wall of said optical box near said optical system.

14. An apparatus according to claim 13, further comprising a filler disposed between said cover and said optical system.

15. An apparatus according to claim 13, wherein said dustproof means further comprises a barrier protruding from said cover near said optical member.

16. A laser beam printer apparatus comprising:

a light source unit;

a deflector for deflecting/scanning a light beam from said light source unit;

an optical system for focusing the light beam from said light source unit onto a predetermined surface;

an optical box incorporating said deflector and said optical system;

a cover fox covering said optical box;

a recess portion formed in at least one of said optical box and said cover;

an elastic member disposed in said optical box to block flow of air, said elastic member having at least a portion which is fitted in said recess portion, and said elastic member being pressed by said cover, and a photosensitive member for receiving the light beam deflected/ scanned by said deflector.

17. An apparatus according to claim 16, wherein said elastic member is compressed and fitted in said recess portion.

18. A laser beam printer apparatus comprising:

a light source unit;

a deflector for deflecting/scanning a light beam from said light source unit;

an optical system for focusing the light beam from said light source unit onto a predetermined surface;

an optical box incorporating said deflector and said optical system;

a cover for covering said optical box;

dustproof means for preventing dust from entering a space portion, in which said deflector is housed, via said optical system, said dustproof means compromising a barrier integrally formed with a bottom wall of said optical box near said optical system; and a photosensitive member for receiving the light beam deflected/scanned by said deflector.

19. An apparatus according to claim 18, further comprising a filler disposed between said cover and said optical system.

20. An apparatus according to claim 18, wherein said dustproof means further comprises barrier protruding from said cover near said optical system.

21. A deflecting/scanning apparatus comprising:

a light source unit;

a deflector for deflecting/scanning a light beam from said light source unit;

an optical system for focusing the light beam deflected/ scanned by said deflector onto a predetermined surface;

an optical box incorporating said deflector and said optical system; and an elastic member disposed in said optical box to block flow of air, said elastic member being provided between a side wall of said optical box and said optical system.

22. An apparatus according to claim 21, wherein said elastic member is provided on opposite ends of said optical system.

23. A deflecting/scanning apparatus comprising:

a light source unit;

a deflector for deflecting/scanning a light beam from said light source unit;

an optical system for focusing the light beam deflected/ scanned by said deflector onto a predetermined surface;

an optical box incorporating said deflector and said optical system; and an elastic member disposed in said optical box to block flow of air, said elastic member being provided between a projecting portion of said optical box and said optical system.

24. An apparatus according to claim 23, wherein said elastic member is provided on opposite ends of said optical system.

25. A deflecting/scanning apparatus comprising:
a light source unit;
a deflector for deflecting/scanning a light beam from said light source unit;
an optical system for focusing the light beam deflected/scanned by said deflector onto a predetermined surface;
an optical box incorporating said deflector and said optical system; and
an elastic member disposed in said optical box to block flow of air, said elastic member sealing a gap between a side surface of said optical box and a side surface of said optical system.

26. An apparatus according to claim 25, wherein said elastic member is provided on opposite ends of said optical system.

27. A laser beam printer apparatus comprising:
a light source unit;
a deflector for deflecting/scanning a light beam from said light source unit;
an optical system for focusing the light beam deflected/scanned by said deflector onto a predetermined surface;
an optical box incorporating said deflector and said optical system;
an elastic member disposed in said optical box to block flow of air, said elastic member being provided between a side wall of said optical box and said optical system; and
a photosensitive member for receiving the light beam deflected/scanned by said deflector.

28. An apparatus according to claim 27, wherein said elastic member is provided on opposite ends of said optical system.

29. A laser beam printer apparatus comprising:
a light source unit;
a deflector for deflecting/scanning a light beam from said light source unit;
an optical system for focusing the light beam deflected/scanned by said deflector onto a predetermined surface;
an optical box incorporating said deflector and said optical system;
an elastic member disposed in said optical box to block flow of air, said elastic member being provided between a projecting portion of said optical box and said optical system; and a photosensitive member for receiving the light beam deflected/scanned by said deflector.

30. An apparatus according to claim 29, wherein said elastic member is provided on opposite ends of said optical system.

31. A laser beam printer apparatus comprising:
a light source unit;
a deflector for deflecting/scanning a light beam from said light source unit;
an optical system for focusing the light beam deflected/scanned by said deflector onto a predetermined surface;
an optical box incorporating said deflector and said optical system;
an elastic member disposed in said optical box to block flow of air, said elastic member sealing a gap between a side surface of said optical box and a side surface of said optical system; and
a photosensitive member for receiving the light beam deflected/scanned by said deflector.

32. An apparatus according to claim 31, wherein said elastic member is provided on opposite ends of said optical system.

33. A deflecting/scanning apparatus comprising:
a light source unit;
a deflector for deflecting/scanning a light beam from said light source unit;
an optical system for focusing the light beam deflected and scanned by said deflector onto a predetermined surface;
an optical box incorporating said deflector and said optical system, said optical box including a window through which the light beam deflected and scanned by said deflector is taken out; and
an elastic member disposed in said optical box to block a flow of air from said window in association with a rotation of said deflector.

34. An apparatus according to claim 33, wherein said elastic member is provided between a side wall of said optical box and said optical system.

35. An apparatus according to claim 33, wherein said elastic member is provided on opposite ends of said optical system.

36. An apparatus according to claim 33, wherein said elastic member is provided between a projecting portion of said optical box and said optical system.

37. An apparatus according to claim 33, wherein said elastic member seals a gap between a side surface of said optical box and a side surface of said optical system.

38. An apparatus according to claim 33, further comprising a cover for covering said optical box, wherein said elastic member is provided between said cover and said optical system.

39. An apparatus according to claim 33, wherein said elastic member prevents air flowing from said window from entering into the atmosphere around said deflector through around said optical system.

40. A laser beam printer apparatus comprising;
a light source unit;
a deflector for deflecting/scanning a light beam from said light source unit;
an optical system for focusing the light beam deflected and scanned by said deflector onto a predetermined surface;
an optical box incorporating said deflector and said optical system, said optical box including a window through which the light beam deflected and scanned by said deflector is taken out;
an elastic member disposed in said optical box to block a flow of air from said window in association with a rotation of said deflector; and
a photosensitive member for receiving the light beam deflected and scanned by said deflector.

41. An apparatus according to claim 40, wherein said elastic member is provided between a side wall of said optical box and said optical system.

42. An apparatus according to claim 40, wherein said elastic member is provided on opposite ends of said optical system.

43. An apparatus according to claim 40, wherein said elastic member is provided between a projecting portion of said optical box and said optical system.

44. An apparatus according to claim 40, wherein said elastic member seals a gap between a side surface of said optical box and a side surface of said optical system.

45. An apparatus according to claim 40, further comprising a cover for covering said optical box, wherein said elastic member is provided between said cover and said optical system.

46. An apparatus according to claim 40, wherein said elastic member prevents air flowing from said window from entering into the atmosphere around said deflector through around said optical system.

47. An apparatus according to claim 1, wherein said optical box includes a window through which the light beam deflected and scanned by said deflector is taken out, and said elastic member blocks a flow of air from said window in association with a rotation of said deflector.

48. An apparatus according to claim 47, wherein said elastic member prevents air flowing from said window from entering into the atmosphere around said deflector through around said optical system.

49. An apparatus according to claim 3, wherein said optical box includes a window through which the light beam deflected and scanned by said deflector is taken out, and said dust proof means blocks a flow of air from said window in association with a rotation of said deflector.

50. An apparatus according to claim 6, wherein said optical box includes a window through which the light beam deflected and scanned by said deflector is taken out, and said elastic member blocks a flow of air from said window in association with a rotation of said deflector.

51. An apparatus according to claim 50, wherein said elastic member prevents air flowing from said window from entering into the atmosphere around said deflector through around said optical system.

52. An apparatus according to claim 8, wherein said optical box includes a window through which the light beam deflected and scanned by said deflector is taken out, and said dust proof means blocks a flow of air from said window in association with a rotation of said deflector.

53. An apparatus according to claim 11, wherein said optical box includes a window through which the light beam deflected and scanned by said deflector is taken out, and said elastic member blocks a flow of air from said window in association with a rotation of said deflector.

54. An apparatus according to claim 53, wherein said elastic member prevents air flowing from said window from entering into the atmosphere around said deflector through around said optical system.

55. An apparatus according to claim 13, wherein said optical box includes a window through which the light beam deflected and scanned by said deflector is taken out, and said dust proof means blocks a flow of air from said window in association with a rotation of said deflector.

56. An apparatus according to claim 16, wherein said optical box includes a window through which the light beam deflected and scanned by said deflector is taken out, and said elastic member blocks a flow of air from said window in association with a rotation of said deflector.

57. An apparatus according to claim 56, wherein said elastic member prevents air flowing from said window from entering into the atmosphere around said deflector through around said optical system.

58. An apparatus according to claim 18, wherein said optical box includes a window through which the light beam deflected and scanned by said deflector is taken out, and said dust proof means blocks a flow of air from said window in association with a rotation of said deflector.

* * * * *

UNITED STATES PATENT AND TRADEMARK OFFICE
CERTIFICATE OF CORRECTION

PATENT NO. : 5,953,042

DATED : September 14, 1999

INVENTOR(S) : NOBORU NABETA ET AL.

It is certified that error appears in the above-identified patent and that said Letters Patent is hereby corrected as shown below:

On the title page items,

[54] TITLE

"DEFLECTING SCANNING" should read --DEFLECTING/SCANNING--.

[56] REFERENCES CITED

Attorney, Agent, or Firm, "Fitzpatrick Cella Harper & Scinto" should read --Fitzpatrick, Cella, Harper & Scinto--.

[57] ABSTRACT

Line 7, "blocking" should read --block the--.

COLUMN 1

Line 1, "DEFLECTING SCANNING" should read --DEFLECTING/SCANNING--.

COLUMN 2

Line 47, "its" should be deleted.

COLUMN 3

Line 21, "an" should read --a--.

UNITED STATES PATENT AND TRADEMARK OFFICE
CERTIFICATE OF CORRECTION

PATENT NO.    : 5,953,042

DATED         : September 14, 1999

INVENTOR(S)   : NOBORU NABETA ET AL.

It is certified that error appears in the above-identified patent and that said Letters Patent is hereby corrected as shown below:

COLUMN 12

Line 22, "an" (2nd occurrence) should be deleted; and
    Line 60, "an" (2nd occurrence) should be deleted.

COLUMN 14

Line 5, "fox" should be deleted and insert --for--.

COLUMN 16

Line 40, "through" should be deleted.

COLUMN 17

Line 10, "through" should be deleted;
    Line 19, "through" should be deleted; and
    Line 33, "through" should be deleted.

UNITED STATES PATENT AND TRADEMARK OFFICE
CERTIFICATE OF CORRECTION

PATENT NO. : 5,953,042

DATED : September 14, 1999

INVENTOR(S) : NOBORU NABETA ET AL.

It is certified that error appears in the above-identified patent and that said Letters Patent is hereby corrected as shown below:

<u>COLUMN 18</u>

Line 12, "through" should be deleted; and
   Line 26, "through" should be deleted.

Signed and Sealed this

Twenty-sixth Day of September, 2000

Attest:

Attesting Officer

Q. TODD DICKINSON

Director of Patents and Trademarks